Nov. 4, 1947.          J. P. SMITH          2,430,307
RECORDER FOR RADAR SYSTEMS
Filed Aug. 30, 1943          3 Sheets—Sheet 3
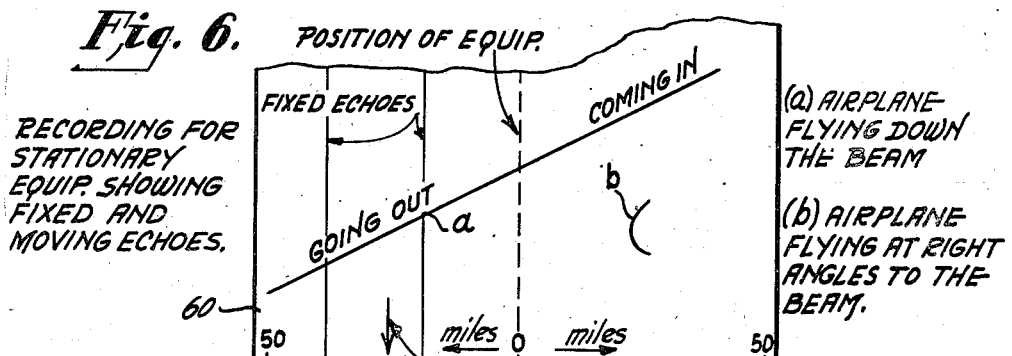
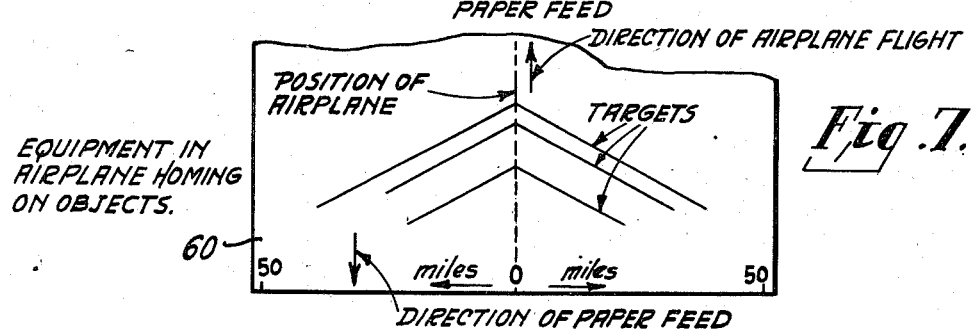
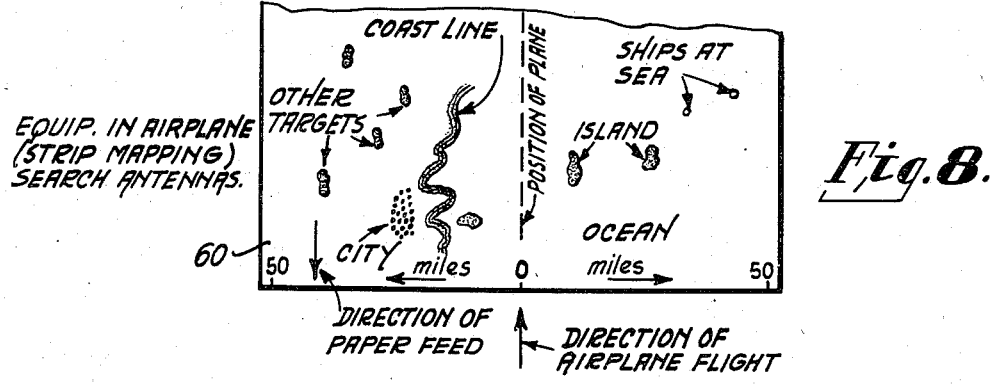
Inventor
JOHN P. SMITH
By
CD Tuska
Attorney Patented Nov. 4, 1947

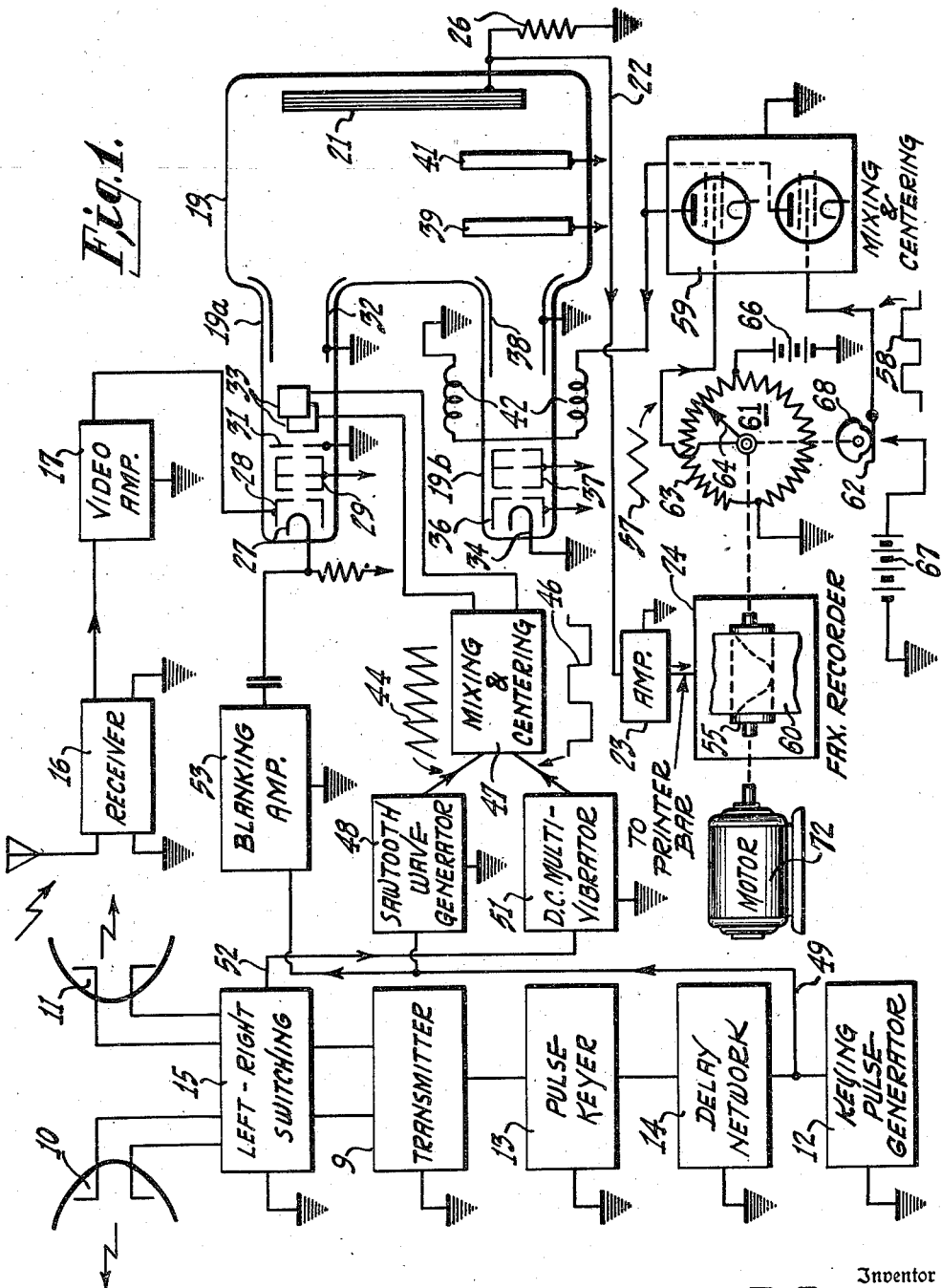

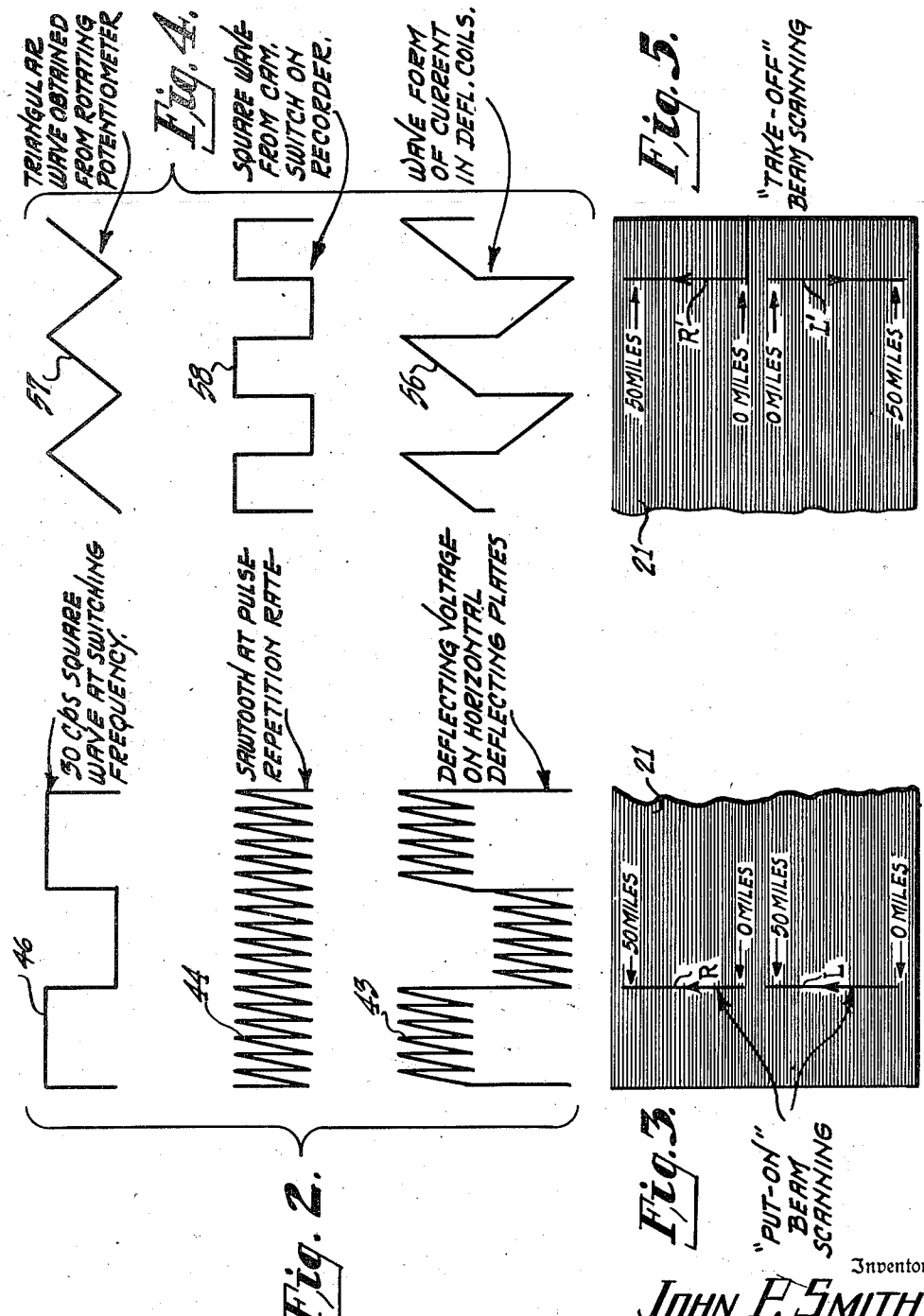

2,430,307

UNITED STATES PATENT OFFICE 2,430,307

RECORDER FOR RADAR SYSTEMS

John P. Smith, Cranbury, N. J., assignor to Radio Corporation of America, a corporation of Delaware Application August 30, 1943, Serial No. 500,738

5 Claims. (Cl. 178—5)

My invention relates to radio locator systems wherein the received information is recorded. More particularly it relates to systems for recording on a tape or paper strip the position of radio wave reflecting objects.

An object of the invention is to provide an improved method of and means for locating and recording the position of wave reflecting objects.

Another object of the invention is to provide an improved method of and means for making a strip map of land or water and of objects such as buildings or ships thereon.

Still another object of the invention is to provide an improved recording system for a radio locator system of the pulse-echo type.

In one embodiment of the invention the radio locator equipment is a pulse-echo system of the type having an antenna system that is switched for directivity to the right and to the left, alternately, to search for or to scan reflecting objects. In order to utilize the information thus obtained for producing a strip map of territory that is flown over by an airplane carrying the locator equipment, or for producing any other desired record, the signals picked up by the left-right antennas are applied successively to a cathode ray storage tube to modulate a "put-on" electron beam whereby they are stored on a storage screen or target until taken off the screen by a "take-off" electron beam that is deflected at a low frequency. Thus the signals may be taken off the storage screen slowly enough for recording them on a slow-speed recorder such as one of the type used in facsimile systems.

The invention will be better understood from the following description taken in connection with the accompanying drawing in which Figure 1 is a block and circuit diagram of a radio locator and strip-mapping system embodying the invention, Figure 2 is a group of graphs showing the deflecting waves for the "put-on" beam of the storage tube shown in Fig. 1, Figure 3 is a view showing one end of the storage screen in Fig. 1 and indicating the trace of the "put-on" beam, Figure 4 is a group of graphs showing the deflecting waves for the "take-off" beam of the storage tube shown in Fig. 1, Figure 5 is a view showing one end of the storage screen in Fig. 1 and indicating the trace of the "take-off" beam, and Figures 6, 7 and 8 are views of records or maps of the character that may be obtained with the system of Fig. 1 for different operating conditions.

In the several figures, similar parts are indicated by similar reference characters.

Fig. 1 shows the invention applied to a pulse-echo system comprising a radio transmitter 9, a pair of directive antennas 10 and 11 for radiating to the left and to the right, respectively, a pulse generator 12 and a pulse keyer 13 for pulse modulating the transmitter 9. A delay network 14 preferably is connected between the pulse generator 12 and the pulse keyer 13. The alternate left-right switching of the antennas 10 and 11 is accomplished by a switching device 15 which may comprise motor driven contact points. The radio pulses, after reflection from a target or other object, are received and demodulated by a radio receiver 16 and supplied through a video amplifier 17 to the "signal put-on" section 19a of a cathode ray storage tube 19 whereby the received pulses are stored on a storage screen 21.

The storage tube "signal put-on" section 19a is operated with a high velocity electron beam. The tube 19 also has a "signal take-off" section 19b, this section being operated with a low velocity electron beam which is deflected across the storage screen 21 at a slow rate to take off the stored signal. The signal thus taken off is supplied over a conductor 22 and through an amplifier 23 to the printer bar (not shown) of a facsimile recorder 24.

Referring more particularly to the storage tube 19, it may be constructed as described in copending application Serial No. 492,658, filed June 26, 1943, by Iams, Rose and Krieger and entitled Cathode ray storage tube. The storage screen 21 comprises a sheet of insulating material such as mica which has a multiplicity of parallel strips of conducting material that are insulated from each other. These strips may be formed by evaporating a metal upon the mica sheet and then scratching through the metal coating with a ruling machine. A metal coating on the back side of the mica sheet functions as the back plate to which an output resistor 26 is connected.

The signal put-on section 19a contains a cathode 27, a control electrode 28, a first anode 29, a screen grid 31, a second anode 32, and a pair of vertical deflecting plates 33 for deflecting the high velocity beam transversely across the conducting strips on the storage screen 21.

The signal take-off section 19b contains a cathode 34, a control electrode 36, a first anode 37, a second anode 38, and a pair of ring electrodes 39 and 41 which slow down the electron of the beam as they approach the storage screen 21. A pair of vertical deflecting coils 42 are provided to deflect the beam transversely across the conducting strips of the screen 21.

Fig. 3 shows how the received signal is stored on the screen 21 by deflecting the high velocity beam across one half of the conducting strips during pulse radiation to the right and by deflecting it across the other half of the strips during pulse radiation to the left as indicated by the beam traces R and L, respectively. The electron beam is deflected in this way by applying a voltage wave 43, shown in Fig. 2, to the deflecting plates 33.

The deflecting wave 43 for the "put-on" deflection may be obtained by adding a sawtooth voltage wave 44 and a rectangular voltage wave 46 in a mixing circuit 47 which, preferably, includes suitable centering means. The sawtooth wave 44 is obtained from a sawtooth wave generator 48 that is synchronized with the radio pulse transmission by means of pulses from the generator 12 supplied over a conductor 49.

The rectangular wave 46 may be obtained from a multivibrator 51 that is triggered by a pulse sent over a conductor 52 each time the switching unit 15 switches to the right or to the left. Suitable blanking pulses may be supplied through a blanking amplifier 53 to the cathode 27; the blanking pulses in the example illustrated blocking the electron beam only during the return line period.

Fig. 5 shows how the stored signal is taken off the screen 21 by deflecting the low velocity electron beam alternately along the traces R' and L' in opposite directions as indicated by the arrows. Since the scanning drum 55 of the facsimile recorder scans in the same direction for recording both "right" and "left" signals, the zero distance line on the record 60 is at the center of the paper strip for distances both to the right and to the left as illustrated in Figs. 6, 7 and 8. The low velocity beam deflection along the traces R' and L' on the screen 21 is obtained by passing through the deflecting coils 42 a current having the wave form shown at 56 in Fig. 4.

The deflecting current 56 is obtained by applying a triangular wave 57 and a rectangular wave 58 to a suitable mixing circuit 59 which adds them together and supplies them to the deflecting coils 42. The circuit 59 also preferably includes suitable centering means for the beam deflection.

The waves 57 and 58 may be obtained from a potentiometer 61 and a cam operated switch 62, respectively. The potentiometer 61 comprises a potentiometer resistor 63 and its rotating arm 64. A battery 66 maintains a current flow through the upper and lower halves of the resistor 63 to ground whereby the voltage taken off the arm 64 increases and decreases linearly as the arm 64 is rotated. The switch 62 is closed periodically by a cam 68 to make contact with a battery 67 whereby the square wave voltage 58 is applied to the mixing circuit 59.

The scanning drum 55 of the recorder 24, the potentiometer arm 64, and the switch cam 68 are all rotated at the same speed and in synchronism by a motor 72 as indicated by the broken lines.

Figs. 6, 7 and 8 illustrate types of records that are obtained under different operating conditions. Fig. 6 shows a record made with the equipment on the ground. The line $a$ is the record trace produced by an airplane flying from right to left towards the equipment and then away from it. The line $b$ is the record trace made by an airplane at the right of the equipment as it flies past the equipment travelling at right angles to the radio beam; i. e., at right angles to the left-right direction.

Figs. 7 and 8 show records of the type obtained when the equipment is mounted in an airplane. The record of Fig. 7 is obtained when the antenna system has directivity forward and either to the right or left depending upon the antenna switch position. As a reflecting target is approached, the distances recorded for left-right decrease symmetrically until the airplane is directly over the target and the recorded distance is zero. Because of the forward directivity of the antenna system, no further signal is reflected from this target and the airplane continues on towards another reflecting target.

The strip map of Fig. 8 is obtained by employing left-right antennas that have a radiation pattern or beam width narrow enough to give the desired resolution. In this case it is assumed that the directivity of the left-right antennas is at right angles to the line of flight.

When the above-described recording apparatus is mounted on an aircraft it may be advisable to control the orientation of the antenna system by suitable means such as a gyro compass. For example, the antennas may be connected with the gyroscopic control equipment commonly employed on an airplane and so controlled that regardless of the direction in which the airplane is headed at a particular time, the antennas are always pointing west and east, respectively. In this example, it is assumed that the airplane is travelling in the general direction of north and south.

It may be noted that the narrower the radiation pattern of the antenna the better will be the resolution of the system in a direction parallel to the direction of flight of the airplane carrying the strip-mapping equipment.

I claim as my invention:

1. A recording system comprising an antenna system for radiating to the left and to the right, means including said antenna system for transmitting a periodically modulated radio wave to the left and to the right toward reflecting objects and for receiving alternately from the left and from the right the waves reflected from said objects, a cathode ray tube having a storage screen comprising a multiplicity of capacity elements upon which a signal may be stored in the form of electric charges, said tube including means for directing an electron beam against said storage screen, means for modulating the beam by the received signals for storing them on said screen, means for deflecting said beam transversely across a portion of said capacity elements in synchronism with said periodic modulation whereby the stored signals are located at distances along a time axis that are representative of the distances to said reflecting objects, said deflecting means including means for deflecting said beam across one portion of said elements during reception from the left and across another portion of said elements during reception from the right, means for producing a second electron beam and means for causing it to scan alternately said two portions of said elements at a comparatively slow rate to produce a distance representative signal that may be recorded, a recorder which includes scanning means, and means for synchronizing said slow scanning of said screen with the scanning of said recorder.

2. A recording system comprising an antenna system for radiating to the left and to the right, means including said antenna system for transmitting a periodically modulated radio wave to the left and to the right toward reflecting objects and for receiving alternately from the left and from the right the waves reflected from said objects, a cathode ray tube having a storage screen comprising parallel storage strips upon which a signal may be stored in the form of electric charges, said tube including means for directing an electron beam against said storage screen, means for modulating the beam by the received signals for storing them on said screen, means for deflecting said beam transversely across said strips in synchronism with said periodic modulation whereby the stored signals are located at distances along a time axis that are representative of the distances to said reflecting objects, said deflecting means including means for deflecting said beam across one half of said strips during reception from the left and across the other half of said strips during reception from the right, means for producing a second electron beam and means for causing it to scan alternately said two halves of said strips transversely at a comparatively slow rate to produce a distance representative signal that may be recorded, a recorder which includes scanning means, and means for synchronizing said slow scanning of said screen with the scanning of said recorder.

3. A pulse-echo locator system comprising means for transmitting radio pulses in two directions to reflecting objects and means for receiving the reflected pulses alternately from said two directions, an electron beam storage tube having a storage screen and means for producing an electron beam and directing it against said screen, means for producing a high frequency deflecting wave occurring in synchronism with the transmission of said pulses, means for producing a low frequency rectangular deflecting wave occurring in synchronism with said alternate reception from said two directions, means for deflecting said electron beam in a certain plane by said deflecting waves, the relative amplitudes of said deflecting waves being such that the beam is deflected alternately across two separate portions of the screen, said tube also having means for producing a second electron beam, means for causing it to scan alternately said two portions of the screen at a comparatively slow rate to produce distance representative signals that may be recorded, a recorder which includes scanning means, and means for synchronizing said slow scanning of said screen with the scanning of said recorder.

4. A pulse-echo locator system comprising means for transmitting radio pulses in two directions to reflecting objects and means for receiving the reflected pulses alternately from said two directions, an electron beam storage tube having a storage screen comprising parallel storage strips and having means for producing an electron beam and directing it against said screen, means for producing a high frequency deflecting wave occurring in synchronism with the transmission of said pulses, means for producing a low frequency rectangular deflecting wave occurring in synchronism with said alternate reception from said two directions, means for deflecting said electron beam in a certain plane by said deflecting waves and transversely across said strips, the relative amplitudes of said deflecting waves being such that the beam is deflected alternately across the two halves of the screen, said tube also having means for producing a second electron beam, means for causing it to scan alternately said two halves of the screen at a comparatively slow rate to produce distance representative signals that may be recorded, a recorder which includes scanning means, and means for synchronizing said slow scanning of said screen with the scanning of said recorder.

5. A pulse-echo locator system comprising means for transmitting radio pulses in two directions to reflecting objects and means for receiving the reflected pulses alternately from said two directions, an electron beam storage tube having a storage screen comprising parallel storage strips and having means for producing an electron beam and directing it against said screen, means for producing a sawtooth deflecting wave occurring at a high frequency in synchronism with the transmission of said pulses, means for producing a low frequency rectangular deflecting wave occurring in synchronism with said alternate reception from said two directions, means for deflecting said electron beam in a certain plane by said deflecting waves and transversely across said strips, the relative amplitudes of said deflecting waves being such that the beam is deflected alternately across the two halves of the screen, said tube also having means for producing a second electron beam, means for causing it to scan alternately said two portions of the screen at a comparatively slow rate to produce distance representative signals that may be recorded, said last means including means for deflecting the second beam in a certain plane by a triangular wave occurring at said slow rate and by a square wave occurring at said slow rate and starting at the same time as said triangular wave, a recorder which includes scanning means, and means for synchronizing said slow scanning of said screen with the scanning of said recorder.

JOHN P. SMITH.

REFERENCES CITED

The following references are of record in the file of this patent:

UNITED STATES PATENTS

| Number | Name | Date |
| --- | --- | --- |
| 2,273,172 | Beers | Feb. 17, 1942 |
| 2,003,294 | Horton | June 4, 1935 |

OTHER REFERENCES

"Television" by Zworykin and Morton, pages 326 and 327.